United States Patent
Estrada et al.

(10) Patent No.: US 9,310,568 B2
(45) Date of Patent: Apr. 12, 2016

(54) HYBRID FIBER CONNECTOR PATCH CORD ASSEMBLIES

(71) Applicant: 3M INNOVATIVE PROPERTIES COMPANY, St. Paul, MN (US)

(72) Inventors: Jesús Estrada, Madrid (ES); Enrique Frutos Fernández, Madrid (ES); Susana Lallena, Madrid (ES)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/511,841

(22) Filed: Oct. 10, 2014

(65) Prior Publication Data

US 2015/0139588 A1 May 21, 2015

Related U.S. Application Data

(60) Provisional application No. 61/904,762, filed on Nov. 15, 2013.

(51) Int. Cl.
*G02B 6/38* (2006.01)
*G02B 6/44* (2006.01)

(52) U.S. Cl.
CPC ........... *G02B 6/3825* (2013.01); *G02B 6/3894* (2013.01); *G02B 6/4494* (2013.01); *G02B 6/4402* (2013.01)

(58) Field of Classification Search
None
See application file for complete search history.

(56) References Cited

U.S. PATENT DOCUMENTS

| 6,435,727 B1 * | 8/2002 | Fingler et al. ............. 385/53 |
| 6,487,344 B1 | 11/2002 | Naudin |
| 7,350,981 B2 | 4/2008 | Durrant |
| 7,369,738 B2 | 5/2008 | Larson |
| 7,614,798 B2 | 11/2009 | Durrant |
| 8,573,859 B2 | 11/2013 | Larson |
| 2007/0274661 A1 | 11/2007 | Allen |
| 2011/0033157 A1 | 2/2011 | Drouard |

FOREIGN PATENT DOCUMENTS

WO    WO 2013-106183    7/2013

* cited by examiner

*Primary Examiner* — Jerry Rahll
(74) *Attorney, Agent, or Firm* — Gregg Rosenblatt

(57) ABSTRACT

Fiber patch cable assemblies are described. More particularly, fiber patch cable assemblies that provide adaptability between a terminal and a drop cable having different connection formats are described.

18 Claims, 6 Drawing Sheets

HYBRID FIBER CONNECTOR PATCH CORD ASSEMBLIES

CROSS REFERENCE TO RELATED APPLICATION

This application claims the benefit of U.S. Provisional Patent Application No. 61/904,769, filed Nov. 15, 2013, the disclosure of which is incorporated by reference herein in its entirety.

FIELD

The present description relates to fiber patch cable assemblies. More particularly, the present description relates to fiber patch cable assemblies that provide adaptability between a terminal and a drop cable having different connection formats.

BACKGROUND

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

In an FTTH network, optical fiber is brought to the end user and connected to the optical network terminal (ONT) unit mounted on a wall at the end user. The ONT converts this optical signal into conventional electrical signals to provide voice (telephone), Internet (data) and video signals to the end user.

Fiber terminals are one type of telecommunication enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to the ONT, located at the end user using a drop cable. Typically, an optical connector attached to the terminal end of an optical fiber of the cable is preferred to allow quick, reliable field installation.

One basic method of introducing an optical fiber into a telecommunication or enclosure is to pass a cable through an inlet device fitted into a port of the telecommunication enclosure. The optical connection interface is made within the enclosure by either an optical connector or an optical splice. Conventional watertight optical fiber connectors are described in U.S. Pat. No. 6,487,344 and U.S. Patent Publication No. 2011/0033157 which can be inserted into a port in the wall of a telecommunication enclosure.

SUMMARY

In one aspect, the present description relates to a fiber patch cable assembly. The fiber patch cable assembly includes a first male connector having a first connection format mounted on one end of a patch cable and a sealed connector receiver having a second connection format on the second end of the patch cable. The first male connector can be inserted into a port of an enclosure to make an optical connection while simultaneously environmentally sealing said port. Further, the sealed connector receiver is configured to accept a second male connector having a connection format corresponding to the second connection format.

DETAILED DESCRIPTION

Figure 1:
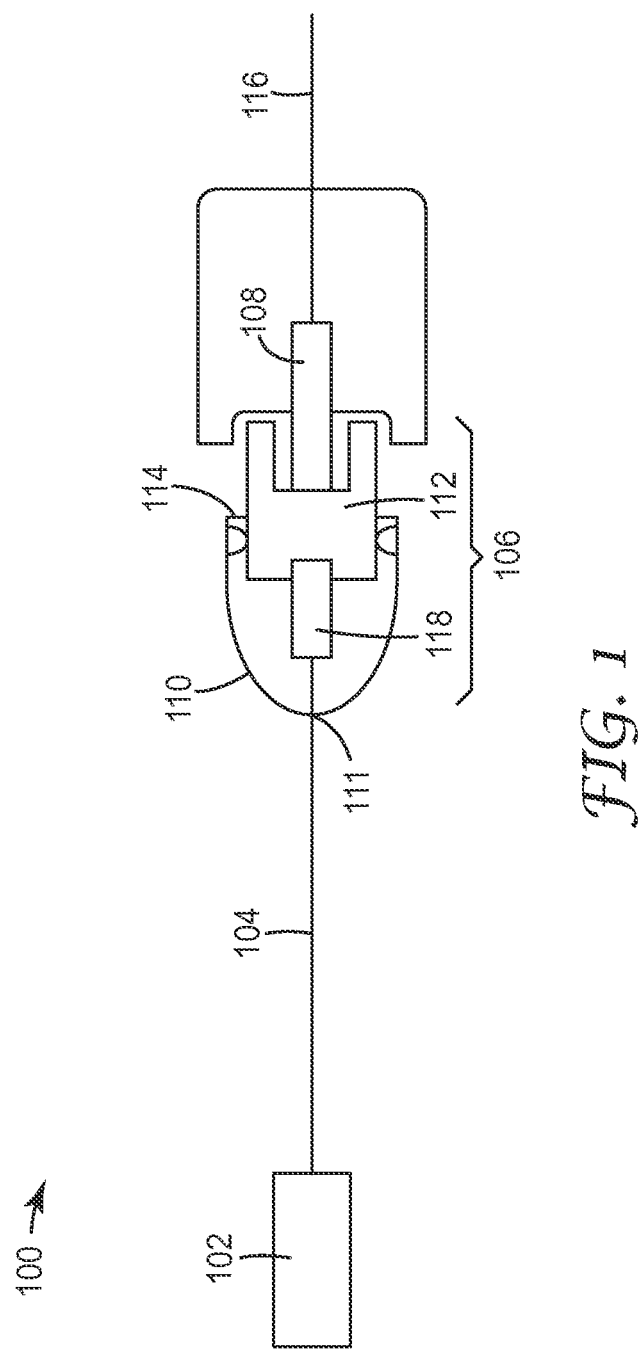
FIG. 1 is a cross-sectional view of a fiber patch cable assembly according to the present description.

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Various types of fiber optic connection formats are known and used in different fiber terminals. Unfortunately, when fiber terminals such as those described in the Background section are replaced, potentially when telecommunication service providers are changed for individuals, they may require a different optical fiber connection format from that of the previously installed terminal. This can require the network installer to route entirely new drop cables from each individual residence or final user with the proper connector format. The present description offers an improvement over this tedious solution by providing a patch cable that enables adaptation between various connector formats at the terminal and drop cable interface.

The present description relates to a fiber patch cable assembly. One illustrative embodiment of a fiber patch cable assembly according to the present description is provided in FIG. 1. Fiber patch cable assembly 100 includes a first male connector 102 that has a first connection format, and is mounted on one end of a patch cable 104. First connection format may be a number of various appropriate fiber optic connection formats. In one embodiment, the first connection format is an SC connector format. Alternatively, the first connection format may be a modified SC connector format. In other embodiments, the first connection format by an LC format, FC format or MPO/MTP format.

In one exemplary embodiment, the patch cable can be a fiber optic cable 104. The fiber optic cable typically includes a semi-rigid outer sheath or jacket surrounding at least one optical fiber and can include one or more strength members. The optical fiber or fibers may be enclosed in one or more loose buffer tubes or may be provided as an optical fiber ribbon cable. In one exemplary embodiment, the patch cable may be a flat cable. Each optical fiber has a polymeric coating that surrounds and protects the glass fiber. Examples of exemplary optical fiber cables that can be used in the exemplary patch cable assembly include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP) optical cable available from Shenzhen SDG Information Company, Ltd. (Shenzhen, China), SE*-LW* FTTH All Purpose Optical Drop Cables and SE-8 PureAccess™ Single Mode Optical Fiber each of which is available from Sumitomo Electric (Research Triangle Park, N.C.), Mini DP Flat Drop Cable available from OFS (Northcross, Ga.). The strength members may be either semi-rigid rods or a collection of loose fibers or floss, e.g. made of aramid fibers or glass.

Figure 2:
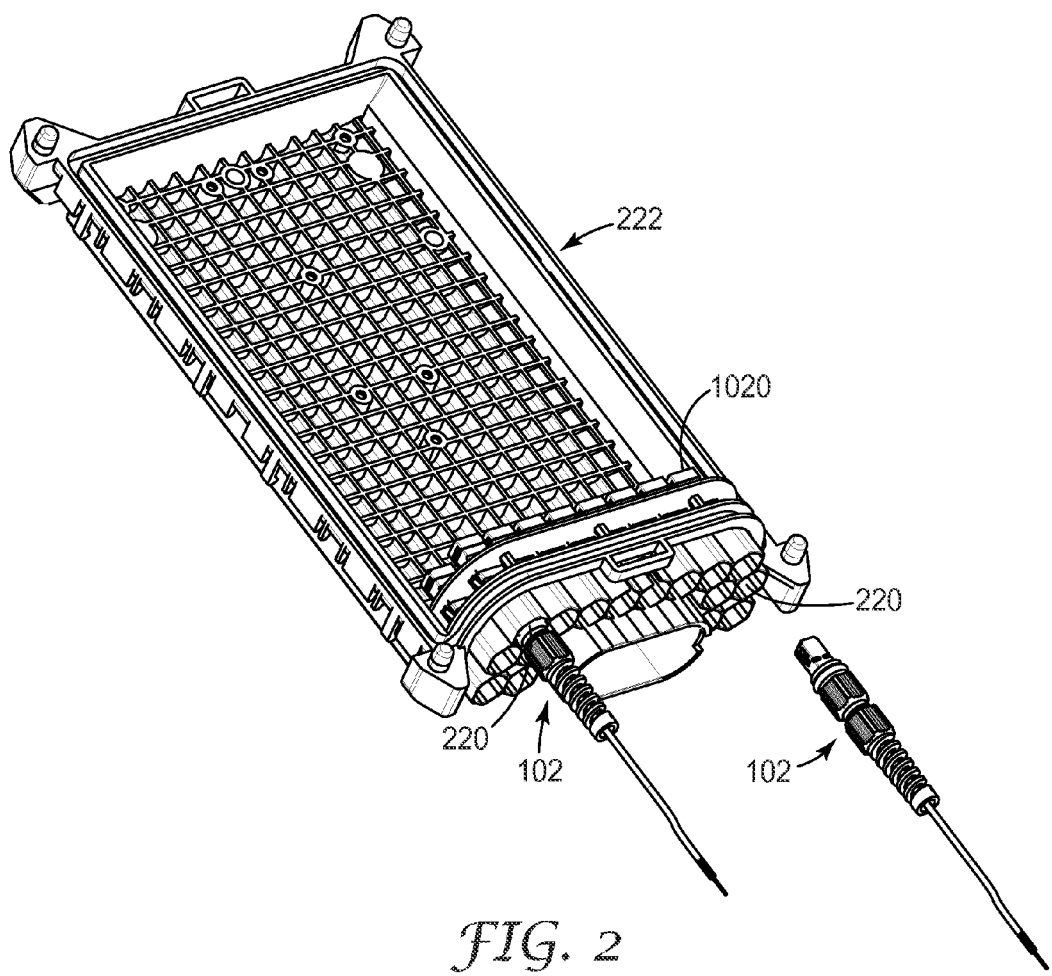
FIG. 2 is a perspective view of a telecommunication enclosure and connector according to the present description.

Returning to FIG. 1, although not shown in the figure, male connector 102 having first connection format can be inserted into a port in a telecommunication enclosure to provide an optical connection interface within the telecommunications enclosure, while simultaneously environmentally sealing said port. Such an embodiment is illustrated in FIG. 2 with male connector 102 and port 220 of enclosure 222, described further below. Alternatively, the optical connection interface may occur at least partially within the port of the telecommunications enclosure. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications. The exemplary fiber optic connector can provide an environmental seal when installed in the port of the telecommunications enclosure. By providing an environmental seal, the inlet device can be designed to provide a watertight or water resistant seal and/or to prevent dust, bugs or any other foreign substance from entering the enclosure.

On the opposing end of patch cable 104 from male connector 102 is a sealed connector receiver 106 having a second connection format. Second connection format may be an SC connector format, a modified SC connector format, an LC format, FC format or MPO/MTP format. However, the second connection format, in many embodiments, will be a different connection format than the first connection format. Sealed connector receiver 106 is configured to accept a second male connector 108 that has a connection format corresponding to the second connection format. On the opposing end of the second male connector may be a drop cable 116. Drop cable 116 may have similar properties to those of the patch cable described above.

Sealed connector is made up in part of a housing 110 and a receptacle 112. As illustrated in FIG. 1, receptacle 112 is sealingly mated to the housing 110. This seal may occur by various appropriate means. For example, in some embodiments, the receptacle may have an external thread that is configured to mate with an internal thread of the housing. This seal can occur, e.g., at position 114 of FIG. 1. In other embodiments, the receptacle can be compression fit within the housing. Additionally, an environmental seal can be formed at the junction of the housing 110 and the patch cable 104 (at junction 111).

Though not illustrated in FIG. 1, in certain embodiments, a mounting device may be coupled to the sealed connector to enable the sealed connector to be mounted to a surface, which may, for example, ease strain on first connector from the weight of drop cable 116, patch cable 104 and the remainder of the construction. Mounting device may be any appropriate mounting device known in the art, such as a clip, fastener, or the like.

Fiber patch cable assembly may further include a third male connector 118 that has a third connection format. In at least one embodiment, the third connection format is an SC connector format. Third male connector 118 is disposed on the second terminal end of the patch cable 104 and is disposed within the connector receiver 106 such that the third male connector is mated to the receptacle 112 within housing 110. Alternatively, the third connection format may be a modified SC connector format, LC format, FC format or MPO/MTP format.

In exemplary embodiments, both first connector 102 and third connector 118 can be field mounted onto the patch cable. Utilizing a field mountable fiber optic connector allows for a sealed optical connection to be made between the first male connector and a communication enclosure. For example, as illustrated in FIG. 2, first male connector 102 may be fitted onto the terminal end of a communication cable, where the first male connector is inserted into the aforementioned port 220 of the telecommunication enclosure 222 and provides an optical connection interface with the telecommunication enclosure 222. An exemplary field mountable fiber optic connector is described in commonly owned U.S. Pat. Nos. 8,573,859 and 7,369,738, each of which is hereby incorporated by reference in its entirety.

Figure 3:
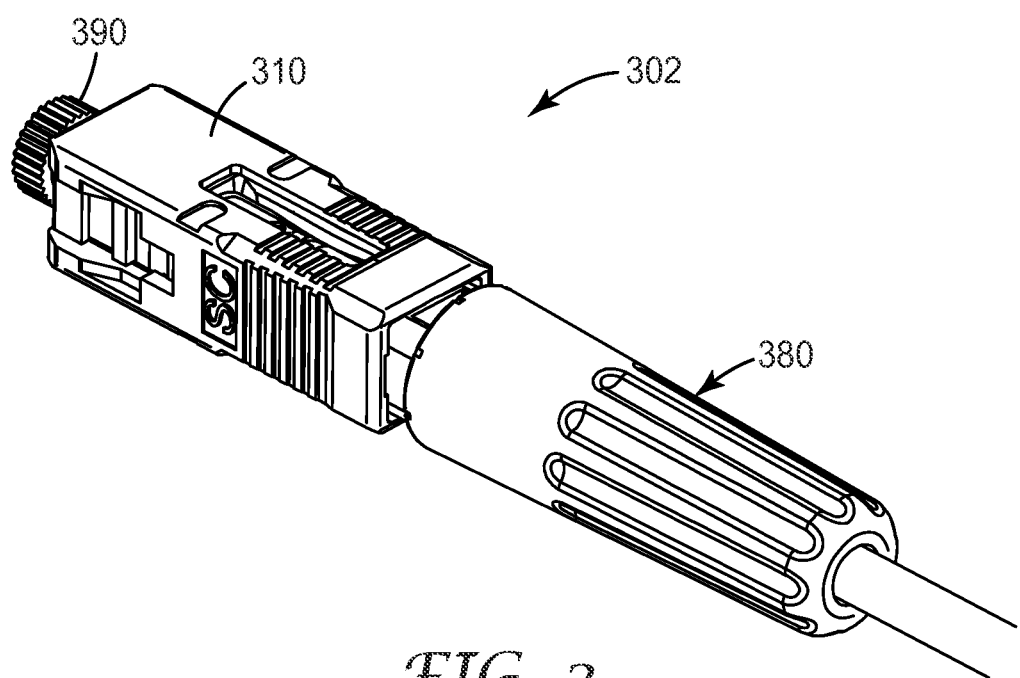
FIG. 3 is a perspective view of connector according to the present description.

A close up view of one particular field mountable fiber optic connector that may be used as first male connector 102 is illustrated in FIG. 3. First male connector 302 can include a connector body having a housing 310 and a fiber boot 380. A cap 390 can be placed at the front end of the connector to protect the stub fiber end when not in use. In one exemplary embodiment, the first male connector may be similar to the connector described in commonly owned and assigned PCT Patent Publication No. WO 2013/106183, the contents of which are hereby incorporated by reference in their entirety.

Figure 4:
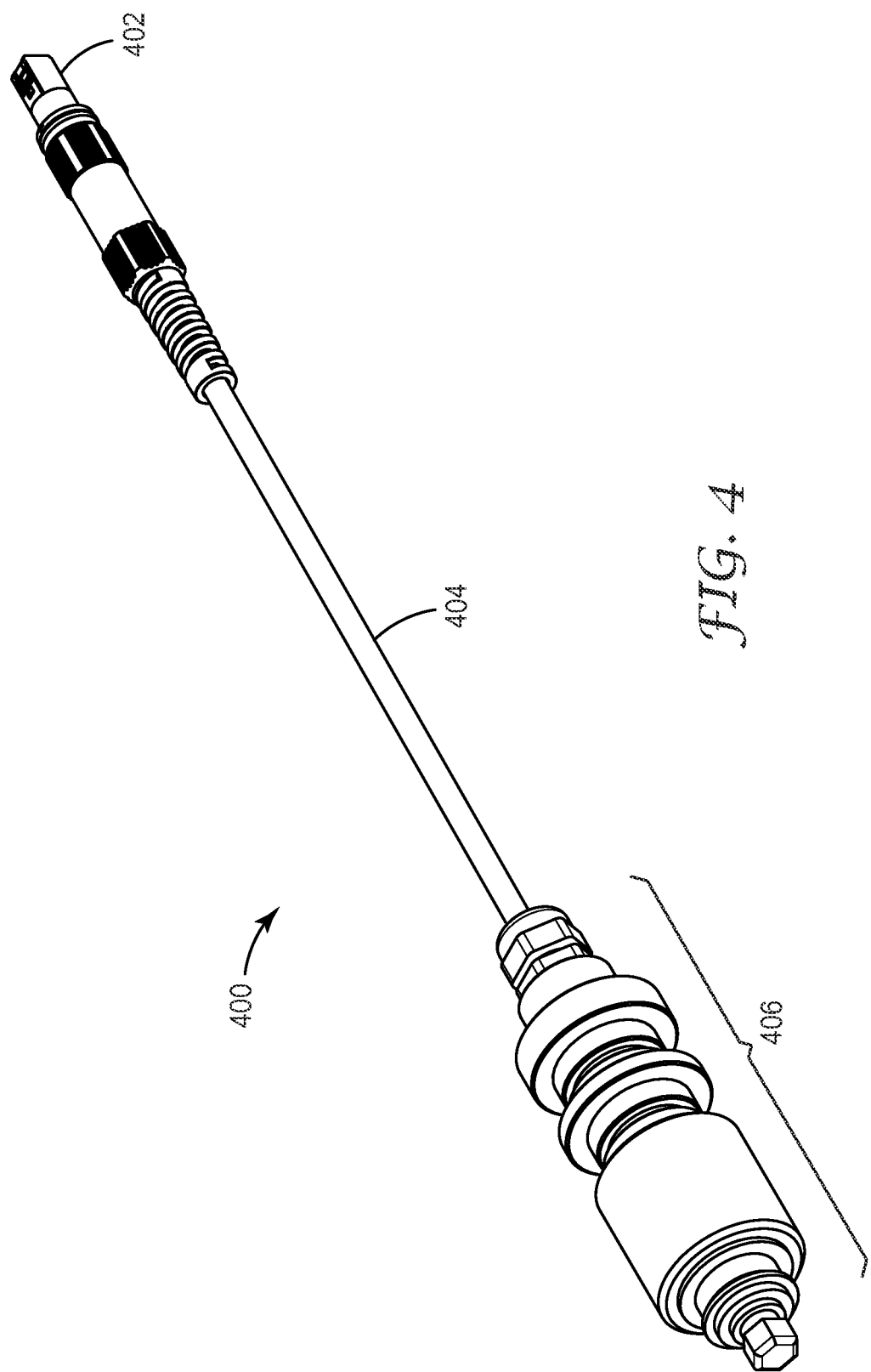
FIG. 4 is a perspective view of a fiber patch cable assembly according to the present description.
Figure 5:
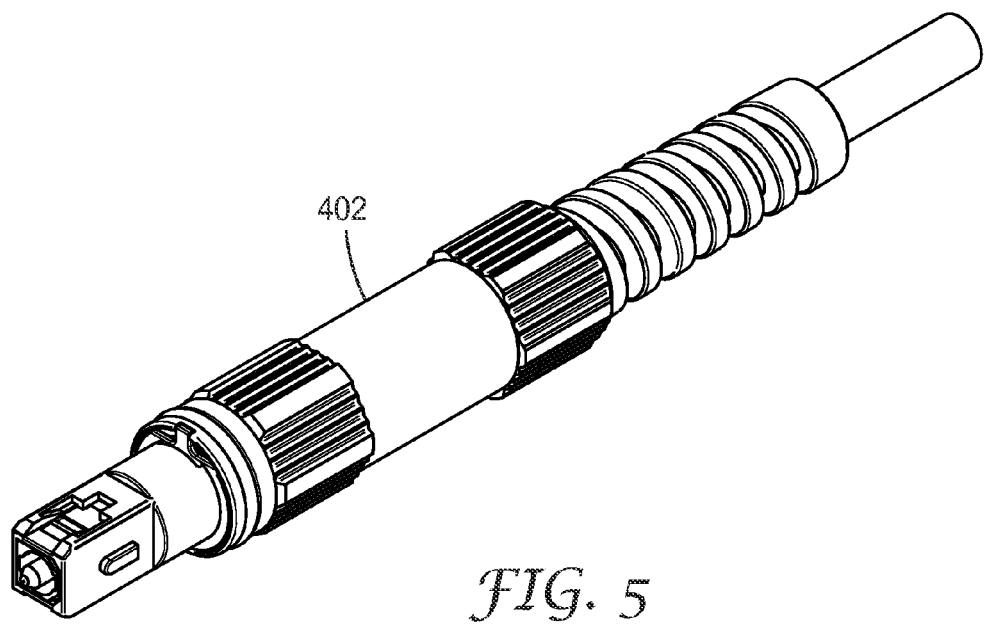
FIG. 5 is a close-up perspective view of a first male connector on a patch cable according to the present description.

FIG. 4 illustrates an exemplary fiber patch cable assembly 400 according to the present description. Cable assembly 400 includes a first male connector 402 having a first connection format and being mounted on one end of a patch cable 404. FIG. 5 provides a close-up (and reversed) view of such a male connector 402 having a first connection format. The male connector is capable of being inserted into a port of an enclosure to make an optical connection while simultaneously environmentally sealing said port (similar to the manner shown in FIG. 2). Here, the first connection format is an SC connection format.

Figure 6:
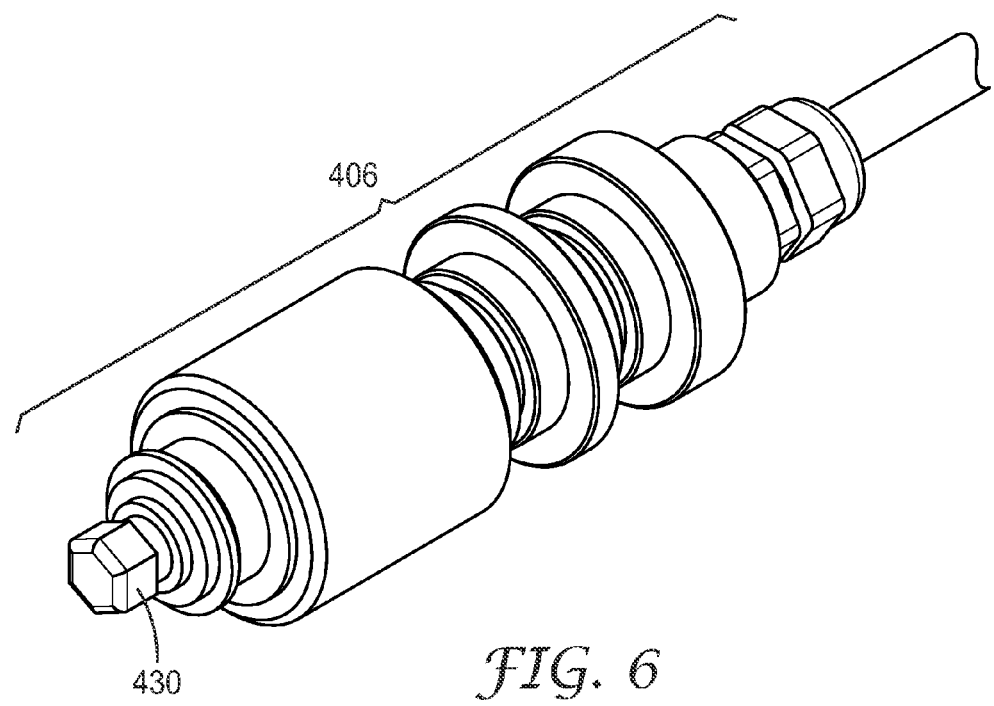
FIG. 6 is a close-up perspective view of a sealed connector receiver on a patch cable according to the present description.

Returning to FIG. 4, the fiber patch cable assembly further provides a sealed connector receiver 406. Second connector receiver has a second connection format and is located on the second end of the patch cable 404, opposite first male connector 402. FIG. 6 is a close-up view of a sealed connector 406 having a second connection format. The sealed connector receiver is configured to accept a second male connector at the port 430 where the plug may be placed (as shown) when not in use. The second male connector has a connection format that corresponds to the second connection format. In this particular example, the second connection format is an MPO/MPT connection format. The illustrated sealed connector FIGS. 4 and 6 may be an OptiTap™ receptacle (from Corning Cable Systems, Inc., Hickory, N.C.), capable of receiving OptiTap™ connectors (having Part Code: KP-OPT-CONN-FD) at port 430.

Figure 7:
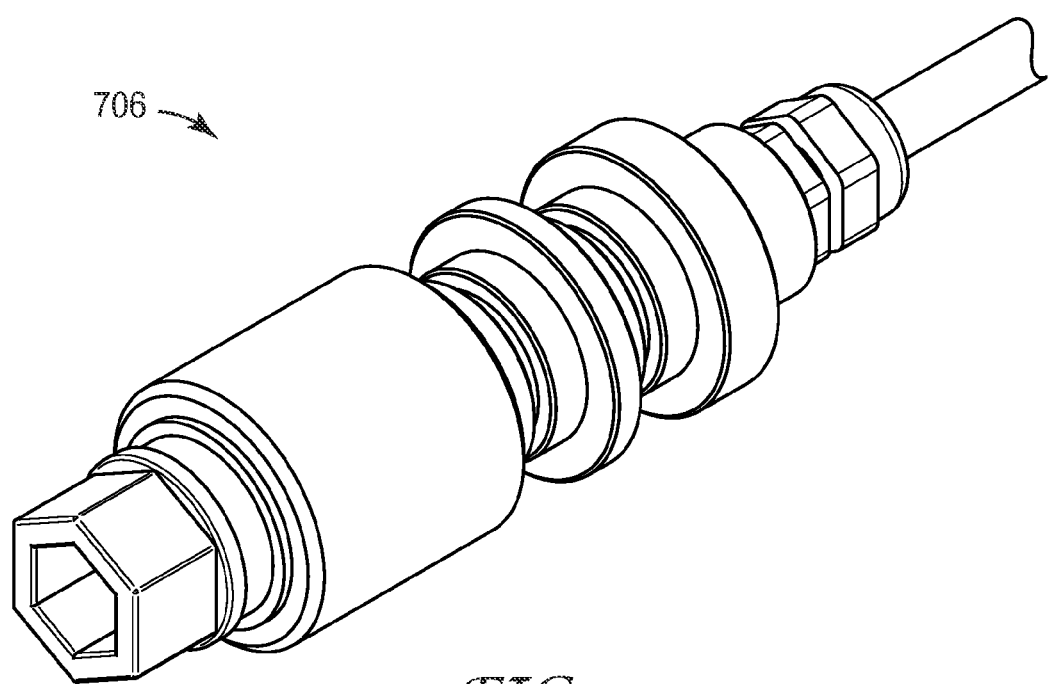
FIG. 7 is a close-up perspective view of a sealed connector receiver on a patch cable according to the present description.

FIG. 7 is a close-up perspective view of yet another appropriate potential connector receiver that may be utilized on the patch cable. In this particular embodiment, the connector receiver 706 may be of an SC connection or modified SC connector format.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. A fiber patch cable assembly comprising:
   a first male connector having a first connection format mounted on one end of a patch cable and a sealed connector receiver having a second connection format on the second end of the patch cable, wherein the first male connector can be inserted into a port of an enclosure to make an optical connection while simultaneously environmentally sealing said port,
   wherein the sealed connector receiver comprises a housing and a receptacle sealingly mated to the housing, wherein the receptacle has an external thread configured to mate with an internal thread of the housing, and the sealed connector receiver is configured to accept a second male connector having a connection format corresponding to the second connection format, and
   a third male connector having a third connection format that is disposed on the second terminal end of the patch cable and is disposed within the connector receiver such that is mated to the receptacle within the housing.

2. The fiber patch cable assembly of claim 1, wherein the receptacle may be compression fit within the housing.

3. The fiber patch cable assembly of claim 1, wherein the second male connector is connected to an external drop cable.

4. The fiber patch cable assembly of claim 1, wherein the first and third connectors can be field mounted onto the patch cable.

5. A fiber patch cable assembly, comprising:
   a first male connector having a first connection format mounted on one end of a patch cable and a sealed connector receiver having a second connection format on the second end of the patch cable, wherein the first male connector can be inserted into a port of an enclosure to make an optical connection while simultaneously environmentally sealing said port, and wherein the sealed connector receiver comprises a housing and a receptacle sealingly mated to the housing, wherein the receptacle has an external thread configured to mate with an internal thread of the housing, and the sealed connector receiver is configured to accept a second male connector having a connection format corresponding to the second connection format.

6. The fiber patch cable assembly of claim 5, further comprising an environmental seal between the housing and the patch cable.

7. The fiber patch cable assembly of claim 5, wherein the second connection format is an MPO/MPT format.

8. The fiber patch cable assembly of claim 5, wherein the third connection format has an SC connector format.

9. The fiber patch cable assembly of claim 5, wherein the first connection format is one of an SC connector format or a modified SC connector format.

10. The fiber patch cable assembly of claim 5, wherein the first connection format is an MPO/MPT format.

11. The fiber patch cable assembly of claim 5, wherein the second connection format is different than the first connection format.

12. The fiber patch cable assembly of claim 5, wherein the patch cable comprises a flat patch cable.

13. The fiber patch cable assembly of claim 5, wherein the patch cable comprises an FRP cable.

14. The fiber path cable assembly of claim 5, wherein the second connection format is one of an SC connector format or a modified SC connector format.

15. The fiber patch cable assembly of claim 5, wherein the first male connector is fitted onto the terminal end of a communication cable.

16. The fiber patch cable assembly of claim 15, wherein the first male connector is inserted into a port in a telecommunication enclosure to provide an optical connection interface with the communication enclosure.

17. The fiber patch cable assembly of claim 5, wherein the first connector comprises a housing and a fiber boot.

18. The fiber patch cable assembly of claim 5, further comprising a mounting device coupled to the sealed connector the mounting device enabling the sealed connector to be mounted to a surface.

* * * * *